(12) United States Patent
Awad

(10) Patent No.: US 7,004,214 B1
(45) Date of Patent: Feb. 28, 2006

(54) HYDRAULIC SYSTEM LINE BLEEDING TOOL

(76) Inventor: Adam Awad, 160 Fairhaven La., Costa Mesa, CA (US) 92626

( * ) Notice: Subject to any disclaimer, the term of this patent is extended or adjusted under 35 U.S.C. 154(b) by 0 days.

(21) Appl. No.: 10/944,388

(22) Filed: Sep. 17, 2004

(51) Int. Cl.
*B65B 1/04* (2006.01)

(52) U.S. Cl. ............... 141/351; 141/98; 81/124.7

(58) Field of Classification Search ............. 141/86, 141/98, 330, 351; 188/352; 81/124.7, 121.1; 251/148, 346; 285/327; 137/614.1, 614.2, 137/614.01, 614.02
See application file for complete search history.

(56) References Cited

U.S. PATENT DOCUMENTS 2,477,864 A * 8/1949 D Elosua ............. 137/327
4,479,511 A * 10/1984 Holland ............... 137/614.2
4,905,731 A * 3/1990 Tamashiro et al. ......... 137/559
5,301,575 A * 4/1994 Mehlau et al. ............ 81/124.7

* cited by examiner

*Primary Examiner*—Timothy L. Maust
(74) *Attorney, Agent, or Firm*—Gene Scott; Patent Law & Venture Group

(57) ABSTRACT

A hand tool apparatus for bleeding a hydraulic line at a fitting, including a fitting engagement portion, a fitting pressure portion, a laterally oriented fitting torquing portion and a fluid conducting portion wherein the fitting engagement portion is an open jaw with a non-round flange fitted to a non-round portion of the hydraulic line fitting, the fitting pressure portion is a cylindrical housing engaged with the fluid conducting portion, the fluid conducting portion is a flexible tube, and the fitting torquing portion is a pair of handles adapted by a hinge pin for mutual rotation to move the fitting engagement portion relative to the fitting pressure portion.

6 Claims, 5 Drawing Sheets

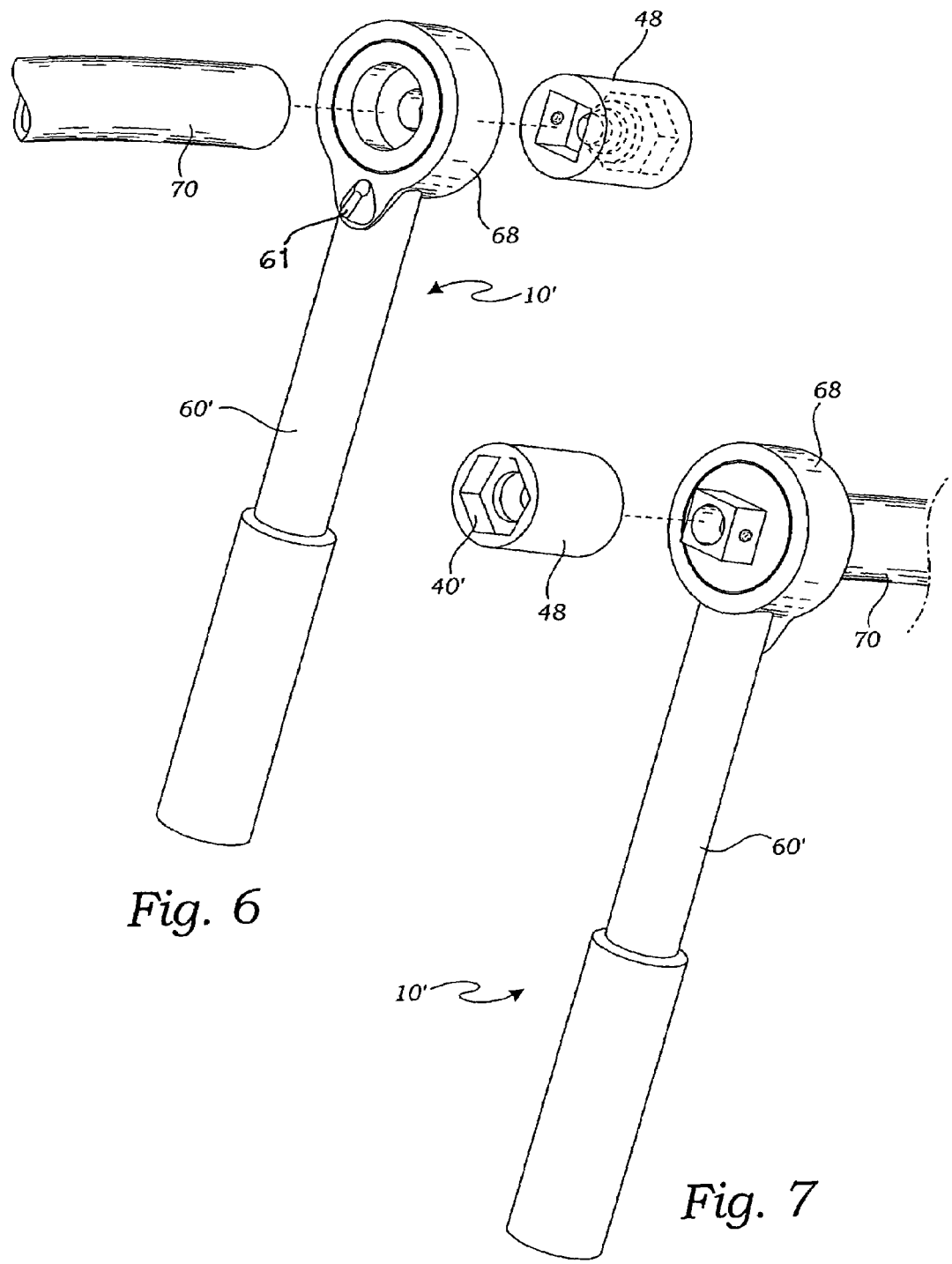

HYDRAULIC SYSTEM LINE BLEEDING TOOL

BACKGROUND OF THE INVENTION

1. Related Applications
none
2. Incorporation by Reference
Applicant hereby incorporates herein by reference, the U.S. patents and U.S. patent applications, if any, referred to in the Description of Related Art section of this application, as filed.
3. Field of the Invention
This invention relates generally to hand tools and more particularly to a hand tool used for bleeding a hydraulic line by clamping a fitting or alternatively by use of a torque wrench.
4. Description of Related Art
The following art defines the present state of this field and each disclosure is hereby incorporated herein by reference:

Stubbins, U.S. Pat. No. 3,635,262, describes a wrench for bleeding brake systems that has a nipple extending from an end thereof to which a flexible tube and a receptacle are connected. Hydraulic fluid in the brake lines is collected through the nipple and the tube into the receptacle. The nipple can be permanently attached to the wrench and the flexible tube can be connected to the nipple so that the wrench, nipple, tube, and receptacle are used as a system and need not be disconnected in order to manipulate the wrench.

Truelove, U.S. Pat. No. 3,677,513 describes a wrench for removing drain plugs, opening or bleeding hydraulic valves or the like when fluid is released. The wrench is provided with an elongated tubular conduit continuous with the head of the wrench so that the released fluid enters the wrench and flows through the tubular conduit to a remote location for storage or disposal purposes.

Wittman, U.S. Pat. No. 3,855,882 describes a hand wrench for use with a bleed valve having a rotatable element controlling fluid discharge through an axial passage, having a shaft with a socket at one end for gripping the valve element and a bore extending from the socket axially through the shaft for conducting fluid discharged from the valve. At the outlet end of the bore, the shaft is shaped to form a nipple for attachment of a conduit. Rods are secured to the shaft and extend at right angles therefrom to provide a handle for turning the wrench. A resilient annular seal is fitted into an enlarged inner portion of the socket for engaging the face of the valve element to prevent leakage during use of the wrench.

Berg, U.S. Pat. No. 4,149,560 describes a one-way valve which may be releasibly attached to a wheel brake cylinder of an automobile for bleeding the brake system of any air existing in such system. The bleeder valve has a quick disconnect which may be snapped over the bleeder outlet in sealing engagement therewith.

Rohr, U.S. Pat. No. 4,332,271, describes a throttling device that is located in a venting pipe or in a pipe section such as a flue gas pipe or conduit arranged between a boiler and a flue or chimney. The flap is held in a pipe section for removal out of the respective pipe either by tilting or by pulling the flap out. For this purpose the pipe section has a slot which is about semicircular and which, in operation, is covered by a ring section or sector. The throttle flap may be pulled out of the pipe section together with the ring section and with its adjustment drive whereby cleaning of the pipe or conduit is substantially facilitated. Heat losses through the flue are avoided when the throttle flap is closed.

Ennis, U.S. Pat. No. 4,785,629 describes an apparatus for removing air from a hydraulic system having a master cylinder, a wheel cylinder disposed at a lower level than the master cylinder, with a hydraulic line connecting the cylinders, and an adjustable bleed nipple at the brake cylinder. The method includes the steps of filling a syringe with fluid and injecting it into the wheel cylinder via the open bleed nipple and through the hydraulic line to the master cylinder where air bubbles rise in the fluid therein and are dispersed to ambient air.

Miller, U.S. Pat. No. 4,865,171 describes a brake bleeder valve which is adapted to be temporarily and releasably connected to a standard brake bleeder screw and/or to a threaded outlet opening in a master cylinder for quickly bleeding a wheel cylinder or caliper and/or the master cylinder is disclosed. The bleeder valve may be molded in one piece body of a flexible or resilient material, such as rubber or the like, and may utilize a duckbill type one-way valve formed therein to permit the flow of air and fluid from the item being bled, but prevent the return of any air. The bleeder valve is particularly useful in bleeding automotive, aircraft or other brake systems.

Weaver et al., U.S. Pat. No. 4,889,149, describes a tubular body that supports a fluid actuated tubular piston connected to operate a coupling mechanism for releasably securing the body to a valve or inlet fitting on a refrigerant or coolant receiving system. The body encloses components which define a center passage connected to the fitting for first evacuating air from the system and then for directing liquid refrigerant or coolant into the system. In one embodiment, the passage receives an elongated valve opening member which is fluid actuated to a position opening the valve fitting, and a movable valve member closes the passage to the flow of refrigerant. The fluid actuated coupling mechanism provides for convenient and simple insertion of the tool assembly onto the fitting with no insertion force and also for automatic release of the tool assembly from the fitting after charging is completed. A fluid actuated valve member minimizes the loss of coolant or the volume of residue refrigerant which vaporizes when the tool assembly is removed from the fitting. When a coolant system is charged, the overflow container is also automatically filled.

Sulwer, U.S. Pat. No. 4,989,639 describes a brake bleeder check valve comprising an elongated bleeder valve body to seat in the bleeder valve recess of a wheel brake housing of a hydraulic brake system for vehicles, to seal the bleeder valve recess closed until the bleeder valve body is loosened for the purpose of bleeding air from the hydraulic lines. An inlet aperture is sealed off from hydraulic fluid in the brake system when the valve body is tightened and fully seated in a bleeder valve recess. A hemi-spherical check valve seat is provided between first and, second passageways of the valve, and a ball check valve is positioned in the larger diameter first passageway together with a coiled compression spring to normally bias the ball check valve to the check valve closed position. When the brake pedal is depressed during a bleeding operation and with the valve body loosened in the bleeder valve recess, hydraulic fluid and entrapped air are forced into the recess to enter the inlet aperture in the side wall of the valve body and on to the ball check valve. The pressurized hydraulic fluid pushes the ball check valve open to continue on through the first passageway and out through the outlet aperture. The brake bleeder valve does not have to be re-tightened in the bleeder valve recess between each downward stroke of the brake pedal to prevent leakage of hydraulic fluid and re-introduction of air into the lines during the interim between downward strokes.

Campbell et al., U.S. Pat. No. 5,213,144, describes a device that is provided for attachment to a pressure tank car for use for the removal of the contents of the tank car in the situation when the tank car is damaged or overturned, said device comprising a metallic tubular assembly attached to a valve on the tank car said tubular assembly containing a relatively inflexible rod-like elongate unit which can be pushed through the tubular assembly and into the valve on the tank car such that the sealing float of the excess flow check valve can be held in the open position thereby permitting removal of the tank contents via the tubular assembly.

Mehlau et al., U.S. Pat. No. 5,301,575, describes a tool for venting hydraulic systems that comprises a tubular tool element which forms a polygonal wrench at a first end. A flexible drain tube extends through the tubular tool element. An end of this drain tube is adapted to be pushed on the nipple of a venting valve. A metal sleeve is located in the flexible drain tube, and a clamping device is provided on the tool element adjacent the metal sleeve for clamping the flexible drain tube to the tool element. This facilitates the assembly and use of the tool. With such a tool, a venting valve is unscrewed to a limited extent through the polygonal wrench such that air is allowed to be vented from the system. The venting valve has a nipple. A flexible drain tube is placed on this nipple. The flexible drain tube prevents uncontrolled outflow of hydraulic liquid from the hydraulic system, thereby preventing contamination of the environment. Instead the hydraulic liquid is guided into a collecting reservoir. Such tools may be used for venting brake systems in vehicles or for venting other hydraulic systems such as heating systems.

McGowan et al., U.S. Pat. No. 5,540,254, describes a system for use in servicing and installing refrigeration systems without Freon leakage comprising a connector, the connector having a first extent with an outboard end and an inboard end, the connector also having a pair of second extents, each with an outboard end and an inboard end, the inboard ends of the first and second extents being coupled together for the passage of fluid therethrough, and a radial aperture formed in an intermediate region of the first extent.

Howser, U.S. Pat. No. 5,775,668, describes a connecting yoke apparatus that is disclosed for attachment to a valve of a compressed gas cylinder. The apparatus includes a yoke member having a first and a second end, the yoke member defining an opening for the reception therein of the valve. A connection extends through the first end of the yoke member for selective connection with the valve. The connection selectively cooperates in fluid tight communication with the valve when the valve is disposed within the opening. A piston is slidably disposed within the yoke member for selectively urging the valve and the connection towards each other such that when the piston is in an operative disposition thereof, the fluid tight communication between the connection and the valve is generated and when the piston is in an inoperative disposition thereof, disengagement of the yoke member from the valve is permitted. A heat sensitive expansion compensation adjuster is disposed between the second end of the yoke member and the piston for adjusting the operative disposition of the piston. The arrangement is such that when the temperature of the apparatus increases, the expansion compensation adjuster progressively moves the piston for urging the valve and the connection towards each other for maintaining the fluid tight communication. A driver cooperates with the piston for driving the piston between the inoperative and operative dispositions thereof.

Mixon, U.S. Pat. No. 5,849,581 describes a brake bleeding tool that allows one person to bleed the hydraulic lines leading to a vehicle wheel cylinder. A check valve allows hydraulic fluid and air to pass out of the wheel cylinder when the brake pedal is depressed and prevents back flow when the brake pedal is released. In one embodiment, a hose connects the check valve to the wheel cylinder and, in another embodiment, a rigid connector connects the check valve to the wheel cylinder. The hose or the rigid connector includes a permanent air trap preventing air bubbles from moving by gravity back into the wheel cylinder when brake fluid flow stops. The air trap is transparent so the air bubbles can be seen. The air trap is such that pumping hydraulic fluid through it purges air in the air trap.

Stubbeman, U.S. Pat. No. 6,276,386, describes an apparatus for charging a fluid line through a coupler such as a penetrator. The apparatus comprises a body formed from a sidewall defining a bore positioned along the longitudinal axis and extending therethrough. The first end of the body forms a substantially flat face. There is a stem positioned within the bore of the body and being movably mounted in the body for movement from a first position to a second position with respect to the body. There is a valve means attached to the apparatus for filling the body with hydraulic fluid. The substantially flat face of the body is fastened to a coupler. There is also an adjustment means attached to the stem for adjusting the position of the stem within the body. A method for charging a downhole hydraulic system is also described. There is also a method for installing a tubing hanger having a production string depending therefrom in a subsea wellhead while maintaining a hydraulically actuated downhole valve in an open position.

Rafko et al., U.S. Pat. No. 6,581,905, describes a brake bleed tool that includes a pliable plastic tube which sealingly engages a bleed fitting. A bleed wrench coaxially slides along the tool to engage the bleed fitting. The bleed wrench includes a socket end for engaging the bleed fitting at one end and a winged end at the opposite end which is used to loosen and tighten the bleed fitting.

Our prior art search with abstracts described above teaches: a valve opening device, a dispensing tool assembly for charging a refrigerant or other fluid into a system, a tool for venting hydraulic systems, a brake bleed tool, a charging device for hydraulic systems, a connecting yoke apparatus, an apparatus for servicing and installing refrigeration systems without Freon® leakage, and a throttling device for pipe conduits. Thus, the prior art shows, that it is known to apply a tool to a fitting for adjusting the fitting and for, at the same time, receiving air and fluid for bleeding or charging a fluid system. However, the prior art fails to teach a specialty piers type hand tool adapted for engaging a fitting, for turning the fitting and for receiving fluid from the fitting without spillage. The prior art also fails to teach a ratchet type hand tool with modified socket and attached drain tube for the same purpose. The present invention fulfills these needs and provides further related advantages as described in the following summary.

SUMMARY OF THE INVENTION

The present invention teaches certain benefits in construction and use which give rise to the objectives described below.

In a best mode embodiment of the present invention, a hand tool apparatus for bleeding a hydraulic line at a line fitting, including a fitting engagement portion, a fitting pressure portion, a laterally oriented fitting torquing portion and a fluid conducting portion, wherein the fitting engagement portion is an open jaw with a hexagonally shaped flange fitted to a hexagonal portion of the hydraulic line fitting, the fitting pressure portion is a cylindrical housing engaged with the fluid conducting portion, the fluid conducting portion is a tubular conductor, and the fitting torquing portion is a pair of handles adapted by a hinge pin for mutual rotation to move the fitting engagement portion relative to the fitting pressure portion. A latch may be provided to lock the tool onto the fitting. In an alternate embodiment, the fitting and pressure portions are combined in a socket attached to a reversible driver having the fluid conductor connected thereto.

A primary objective of the present invention is to provide an apparatus and method of use of such apparatus that yields advantages not taught by the prior art.

Another objective of the invention is to engage a hydraulic fluid bleed fitting laterally, to turn the fitting to open it and to receive bleed fluid for conduction away from the fitting.

A further objective of the invention is to engage a hydraulic fluid bleed fitting axially, to turn the fitting to open it and to receive bleed fluid for conduction away from the fitting.

A still further objective of the invention is to provide such enablement in a simple and durable hand tool.

Other features and advantages of the embodiments of the present invention will become apparent from the following more detailed description, taken in conjunction with the accompanying drawings, which illustrate, by way of example, the principles of at least one of the possible embodiments of the invention.

BRIEF DESCRIPTION OF THE DRAWINGS

The accompanying drawings illustrate at least one of the best mode embodiments of the present invention. In such drawings:

FIG. 6 is an exploded perspective view of a second embodiment of the present invention;

FIG. 7 is a further illustration of FIG. 6 as viewed from and opposing direction;

DETAILED DESCRIPTION OF THE INVENTION

The above described drawing figures illustrate the present invention in at least one of its preferred, best mode embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and that they should not be taken as limiting the invention as defined in the following.

Figure 1:
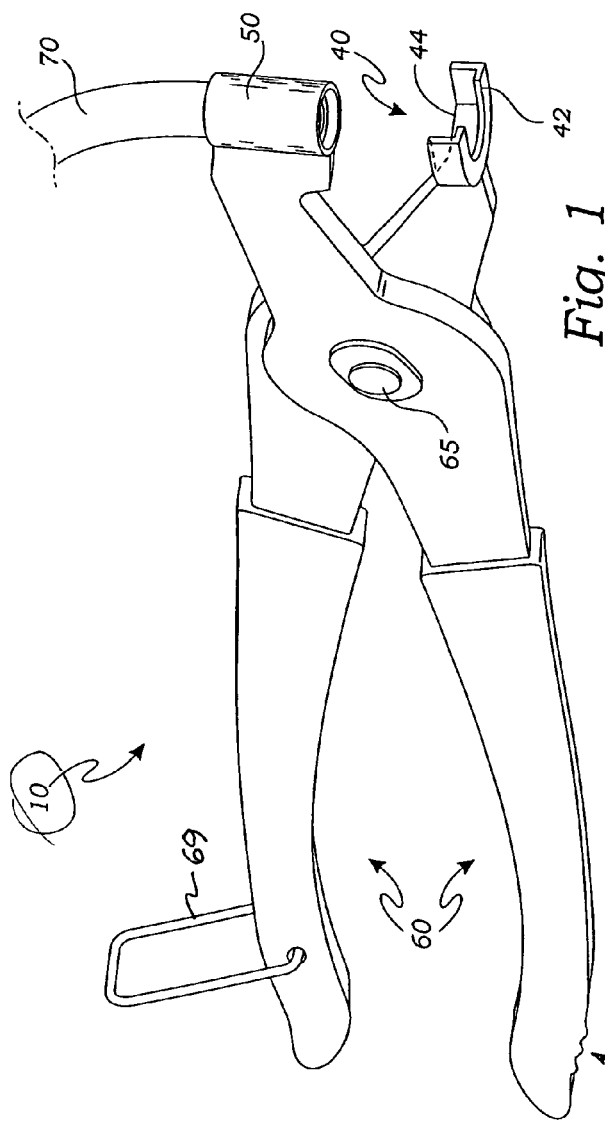
FIG. 1 is a perspective view of a first embodiment of the present invention.
Figure 2:
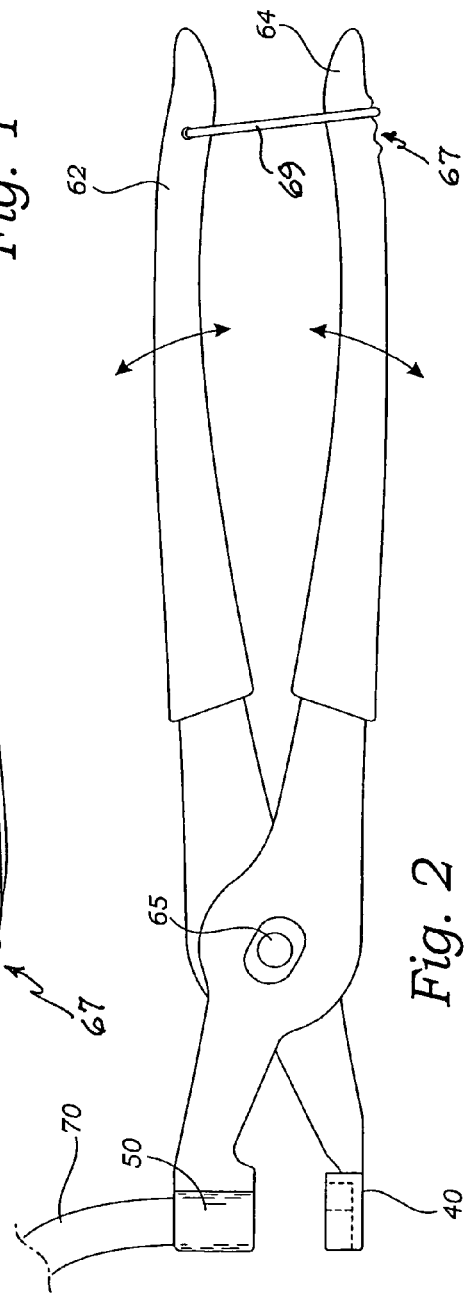
FIG. 2 is a side elevational view thereof.
Figure 3:
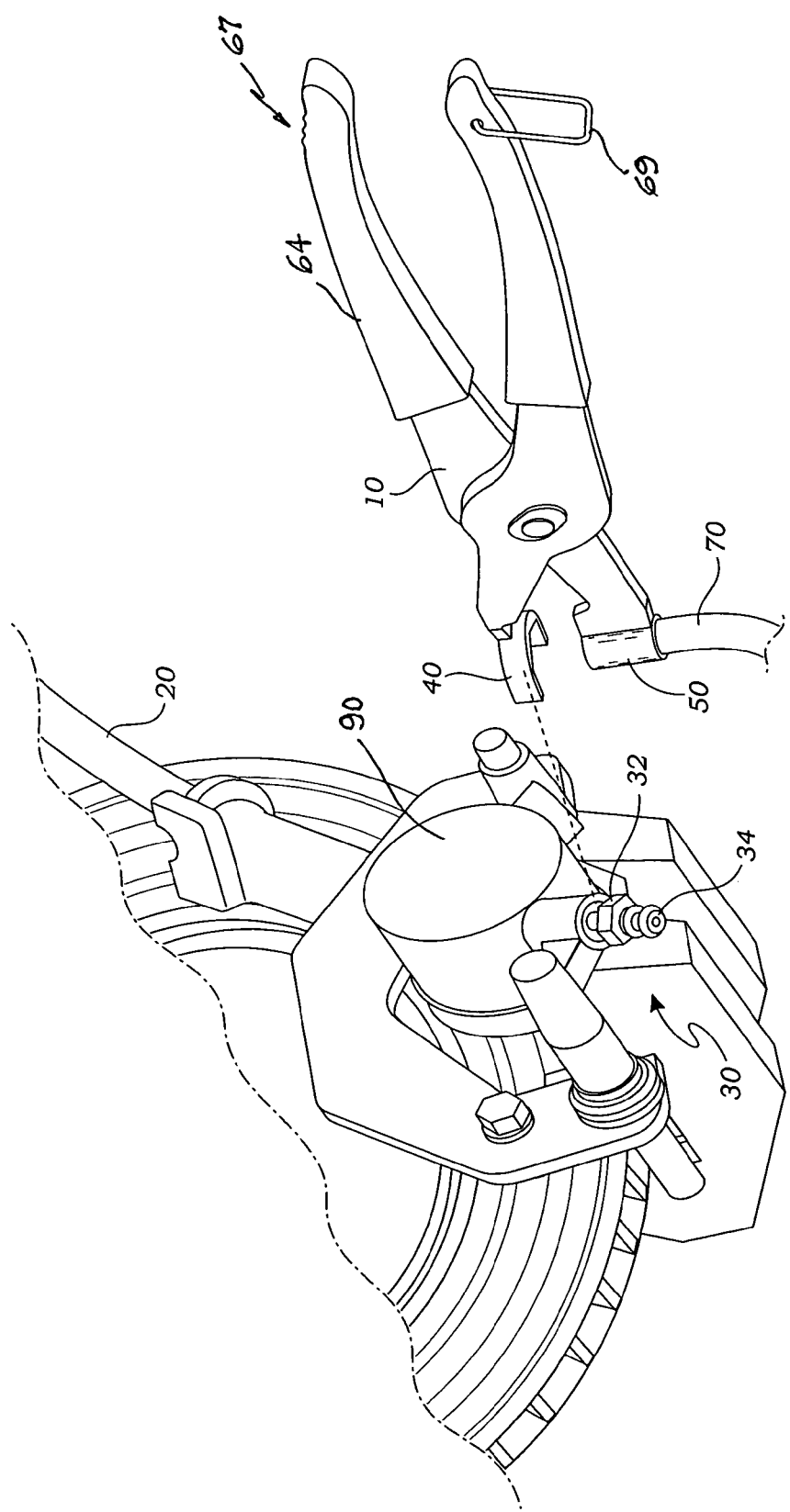
FIG. 3 is a perspective view thereof prior to engagement with a hydraulic line fitting.
Figures 4, 5:
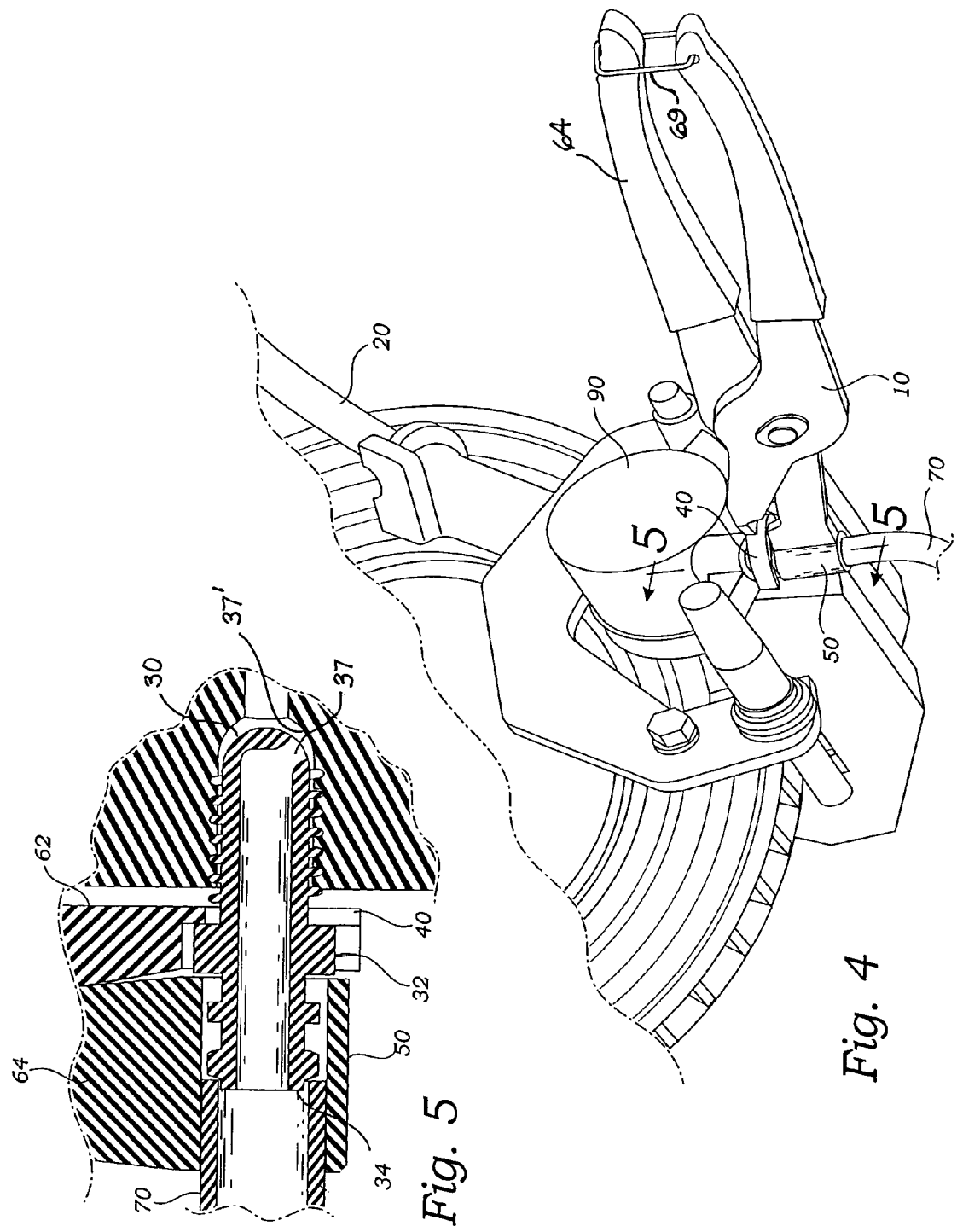
FIG. 4 is a perspective view thereof as engaged with the hydraulic line fitting.
FIG. 5 is a partial sectional view taken along line 5—5 in FIG. 4.
Figure 8:
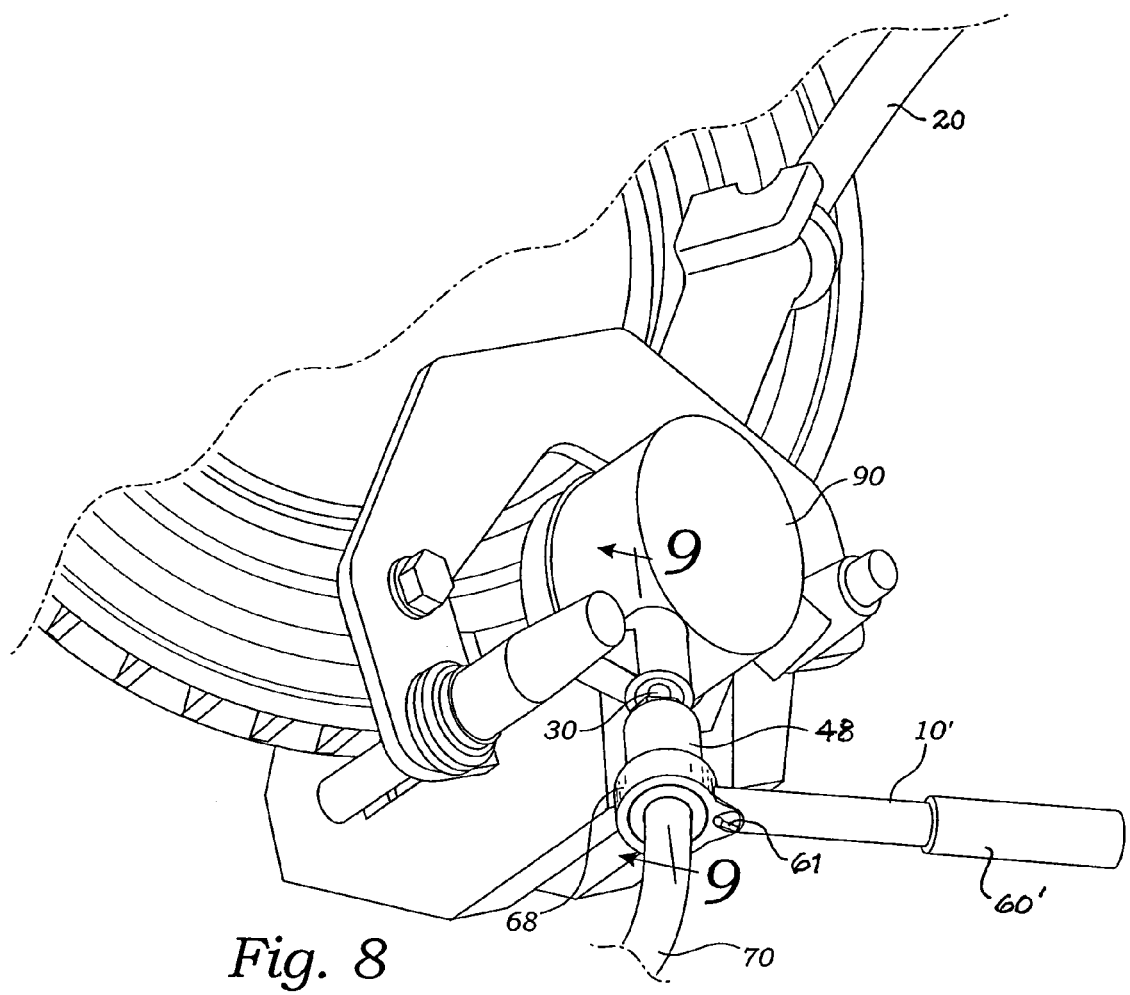
FIG. 8 is a perspective view thereof as engaged with the hydraulic line fitting.

In one embodiment of the present invention, as shown in FIGS. 1–5, a hand tool apparatus 10 is used for bleeding a hydraulic system including lines 20 and actuators 90 (FIG. 3), at a hydraulic line fitting 30. Such a line 20 may be a hydraulic line in an automotive braking system and such is a typical application of the present invention as best shown in FIGS. 3 and 4. The fitting 30 may be a zerk type fitting as shown, or any similar fitting. The fitting 30 typically has a non-round flange portion 32 which is used to rotate the fitting 30 so as to open the fitting 30 so that hydraulic fluid and any trapped air that may be in the system may be expelled, i.e., "bleeding the hydraulic lines." In one embodiment of this hand tool 10, a fitting engagement portion 40 is adapted to engage the fitting's flange portion 32, and a fitting pressure portion 50 is adapted for receiving the fitting 30, and a laterally oriented torquing portion 60 is adapted for applying a rotational torque to the engagement portion 40, and finally, a fluid conducting portion 70 adapted for capturing fluid and any air which is bled from the hydraulic lines 20.

Preferably, in this first embodiment, the fitting engagement portion 40 is an open jaw 42 with a non-round flange 44 fitted to the non-round flange portion 32 of the hydraulic line fitting 30. The open jaw 42 is sized to fit around the fitting 30 and into contact with the flange portion 32 so that the apparatus is able to grip the fitting 30. Non-round elements such as flange portion 32 are normally hexagonal in shape, but may be other non-round configurations such as square, serrated, etc.

Preferably, the fitting pressure portion 50 is a cylindrical housing engaged with the fluid conducting portion 70, which is preferably a tubular fluid conductor, as shown in FIG. 3.

Preferably, the torquing portion 60 is a pair of handles 62 and 64 (FIG. 2) adapted by a hinge pin 65 for mutual rotation, as shown by arrows in FIG. 2, to move the fitting engagement portion 40 relative to the fitting pressure portion 50, i.e., to adjust the space between the two elements 40 and 50.

In use, this first embodiment, shown in FIGS. 1–5, comprises a modified hand pliers type tool with the working end configured with the fitting engagement portion 40 mounted terminally on one jaw of the tool, and the fitting pressure portion 50 mounted on the opposing jaw of the tool. To apply the tool 10 the open jaw 42 is engaged with the fitting 30 on one side of the non-round flange portion 32, as shown in FIG. 5, and then the fitting pressure portion 50 is closed over the fitting 30 by pressing handles 62 and 64 toward each other so that the pressure portion 50 engages a spout 34 of the fitting 30. This arrangement is well shown in the sectional view of FIG. 5. Once the tool 10 is fully engaged with the fitting 30, the torquing portion 60 (handles 62 and 64) is moved to rotate the fitting 30 so as to draw the distal end 37 of fitting 30 away from its seat 37' thereby allowing fluid and any air to escape the hydraulic system. In this manner, the fluid and air in the hydraulic system moves through the fitting 30 and into the fitting pressure portion 50 into the fluid conducting portion 70 where it may be drained into a disposal receptacle (not shown). Typically, the bleeding process is conducted by applying hydraulic pressure to the hydraulic system while rotating the fitting 30 to allow air to escape. The fitting 30 is then rotated to close it prior to releasing the hydraulic pressure. This process is repeated until all of the air has been purged from the hydraulic system. A latch 69 is provided, as shown in FIGS. 3 (shown unlatched), and FIG. 4 (shown latched). It is noted that a series of grooves 67 are placed on handle 64 for receiving the latch 69 so that the apparatus may be held in the closed position and engaged with the fitting 30. This allows a mechanic to use both hands for other tasks while the tool 10 is maintained in place. The handle 64 is configured to allow the grooves 67 to be placed such that the latch 69 may be closed at selected ones of the grooves 67 to vary the spacing between elements 40 and 50 so as to accommodate fittings 30 of differing sizes and types.

Figure 9:
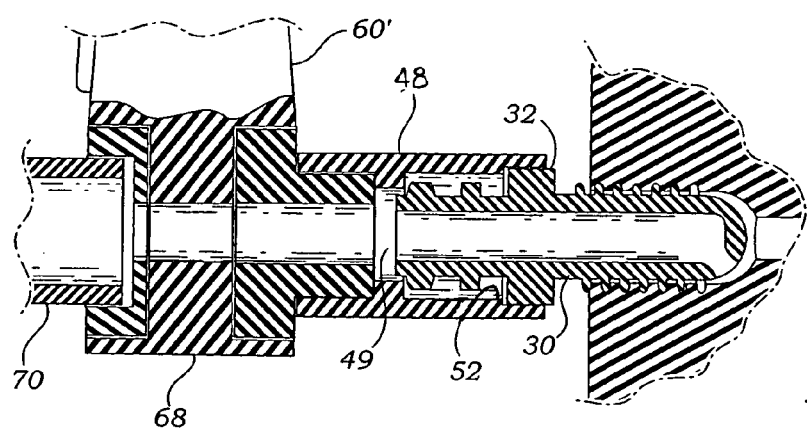
FIG. 9 is a partial sectional view taken along line 9—9 in FIG. 8.

In an alternate embodiment of the present tool (FIGS. 6–9), identified by numeral 10' in FIGS. 6 and 7, a fitting engagement portion 40' is a non-round socket surface 40' within a typical tool socket 48, and is preferably hexagonal in conformation and of such size as to fit over the non-round flange portion 32 of the hydraulic line fitting 30, as shown in FIG. 9. A fitting pressure portion 52 is an annular internal shoulder within the socket 48 which is placed into contact with the flange portion 32 for applying pressure against the flange portion 32. As above, the fluid conducting portion 70 is a tubular conductor engaged with a socket driver 68. The driver 68 is adapted, as is well known in the art, for receiving the socket 48. The fitting torquing portion 60' is a typical rod handle integral with the driver 68, as is also well known. The socket 48 is adapted by conducting path 49 for enabling fluid and air to pass from the fitting 30, through the socket 48, to the fluid conducting portion 70, as is shown in FIG. 9. As shown in FIG. 6, a means for reversing torque rotational action is provided in lever 61. Such means is well known in the art of torque wrenches and allows the tool to be set to loosen or tighten the fitting 30.

A specific means for engagement of the fluid conduction portion 70 with the socket driver 48 is not shown, however, such an engagement may be by any well known means including a compression fitting, bonding, welding, etc.

The enablements described in detail above are considered novel over the prior art of record and are considered critical to the operation of at least one aspect of one best mode embodiment of the instant invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of the embodiments of the herein described invention and its related embodiments not described are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A hand tool apparatus for bleeding a hydraulic line at a fitting, the apparatus comprising: a fitting engagement portion pivotally engaged with a fitting pressure portion such that the fitting engagement portion and the fitting pressure portion are engagable with the fitting therebetween, a laterally oriented fitting torquing portion and a fluid conducting portion, wherein the fitting engagement portion is enabled for engagement with the hydraulic line fitting from a lateral direction and is further enabled for clamping on the fitting.

2. The apparatus of claim 1 wherein the fitting engagement portion is an open jaw with a non-round flange fitted for rotational torque application to a non-round portion of the hydraulic line fitting.

3. The apparatus of claim 1 wherein the fitting pressure portion is a cylindrical housing engaged with the fluid conducting portion so as to enable fluid and air entering the fitting pressure portion to flow into the fluid conduction portion.

4. The apparatus of claim 3 wherein the fluid conducting portion is a flexible tube.

5. The apparatus of claim 1 wherein the fitting torquing portion is a pair of handles adapted by a hinge pin for mutual rotation to adjust a space between the fitting engagement portion relative to the fitting pressure portion.

6. The apparatus of claim 1 further comprising a latching means for securing the fitting engagement portion and the fitting pressure portion in claming action on the fitting.

* * * * *